United States Patent [19]

Rosenberg et al.

[11] 4,205,993
[45] Jun. 3, 1980

[54] CONCRETE WATER-REDUCING ADMIXTURE

[75] Inventors: Arnold M. Rosenberg, Potomac; James M. Gaidis, Ellicott City, both of Md.

[73] Assignee: W. R. Grace & Co., New York, N.Y.

[21] Appl. No.: 952,306

[22] Filed: Oct. 18, 1978

[51] Int. Cl.$^2$ .............................................. C04B 7/352
[52] U.S. Cl. ...................................... 106/92; 106/314; 106/315
[58] Field of Search .......................... 106/92, 314, 315

[56] References Cited

U.S. PATENT DOCUMENTS

| | | | |
|---|---|---|---|
| 2,418,431 | 4/1947 | Scripture | 106/92 |
| 3,053,673 | 9/1962 | Walker | 106/92 |
| 3,801,338 | 4/1974 | Whitaker | 106/315 |

Primary Examiner—James Poer
Attorney, Agent, or Firm—Howard J. Troffkin; William W. McDowell, Jr.

[57] ABSTRACT

A water-reducing admixture for use in hydraulic cement compositions comprising about 25 parts by weight of a lignosulfonic acid salt, from about 6 to 16 parts of calcium formate; and from about 2 to 8 parts of monosaccharides.

10 Claims, No Drawings

CONCRETE WATER-REDUCING ADMIXTURE

BACKGROUND OF THE INVENTION

The subject invention is directed to water-reducing admixture compositions suitable for use with hydraulic cements.

Admixtures are materials other than water, aggregate and hydraulic cement that are used as an ingredient of a concrete or mortar mixture and which are added to the batch immediately before or during its mixing. They are used to modify the concrete to make it more suitable for the work at hand, to gain some economic advantage or to modify the cement for a particular application in a manner which would be impossible without the use of the admixture. For example, it is common practice to incorporate certain admixtures into cement compositions to accelerate or increase strength development, retard or accelerate initial set, modify bleeding behavior, inhibit corrosion of metals embedded in the cement, as well as other desired effects. Some admixtures are known to effect more than one property of concrete and, commonly, will beneficially effect one property to the detriment of another.

Certain organic compounds or mixtures of organic and inorganic compounds used as admixtures affect the slump, air content and water requirement of the formed concrete in an interrelated manner. These admixtures, commonly known as water reducers or water-reducing retarders, are covered in the Specification for Chemical Admixtures for Concrete, ASTM Designation C 494 and include naphthalene sulfonate-formaldehydes, hydroxylated carboxylic acids and their salts and lignonsulfonic acid and its salts. The lignosulfonic acid salts which are commonly used are the salts of calcium, sodium or ammonium which are produced during the sulfite process of wood-pulping. It is generally believed that the effluent from the wood-pulping operation, although containing the desired lignosulfonate, is not suitable for use as a water-reducing admixture but must be refined to remove substantially all of the impurities present prior to use.

The hydroxylated carboxylic acid salts most commonly used are calcium and sodium salts of hydroxylated adipic or gluconic acid. These materials adversely affect the bleeding characteristics of the cement and, therefore, are not widely used.

The acids or acid salts used as water-reducing admixtures cause extended retardation of the hardening time of the cement and, thereby, cause an undesired delay in the utilization of the formed concrete. Modification of such admixtures to reduce or eliminate the extended retardation is conventionally done by the addition of calcium chloride, alkyl aryl sulfonates or triethanolamine. The latter two materials are expensive to produce and, therefore, greatly add to the cost of the finished concrete. Further, amines tend to cause instability of the admixture during storage. Calcium chloride, although beneficially modifying the water reducer, causes extensive corrosion to metal pieces contained in or in contact with the hardened concrete.

It is therefore desired to produce a water-reducing admixture which is inexpensive, non-corrosive, permits decreased use of water to cement maintains or improves the slump of the wet concrete and results in improved strength of the hardened concrete.

SUMMARY OF THE INVENTION

The object of the present invention is to produce admixture compositions which are useful with hydraulic cements to produce the desired properties of reduction of water to cement ratio while retaining or improving slump of the concrete mix. Another object is to produce an admixture which does not cause extensive retardation of the concrete mix while permitting the formation of a concrete of good compressive strength. A further object is to produce an admixture which is economically attractive and which does not cause detrimental effects to the cement or metal components in contact with the concrete.

The above objects are achieved by water-reducing admixtures of the present invention which are formed by the combination of about 25 parts by weight of a lignosulfonate salt of an alkali or alkaline earth metal, from about 2 to about 8 parts of a sugar, and from about 6 to 16 parts of calcium formate. The present invention is further directed to an improved hydraulic concrete having the subject water-reducing admixture therein.

DETAILED DESCRIPTION OF THE INVENTION

The present invention is directed to water-reducing admixtures formed from non-corrosive, readily-available materials comprising a combination of a lignosulfonate, calcium formate and sugar.

The lignosulfonate can be a salt of any alkali metal such as sodium, potassium or the like or of an alkaline earth metal such as calcium, magnesium and the like. The preferred salts are magnesium or calcium lignosulfonate. These salts are commonly obtained as by-products of conventional sulfite wood-pulping operations.

It has been presently found that the desired water-reducing admixture of the present invention can be formed from the above-described lignosulfonate salts either as a purified product, as is presently used in conventional admixtures or as an unpurified product as the obtained by-product of wood-pulping operations and the like. The utilization of the unpurified salts are preferred as they do not require costly purification processing while not detracting from the effectiveness of the present admixture. The unpurified salts can contain by-products normally associated therewith such as monosaccharides as, for example, xylose, mannose, glucose, fructose and the like. These sugar by-products can be present in from about 3 to 30 percent by weight based on the weight of lignosulfonate as is normally encountered in sulfite process effluent.

The ability to use lignosulfonate salts which are not required to be purified of other effluent by-products, such as tree sugars and the like, unexpectedly permits the formation of a more economically and effective admixture than presently used.

In addition to the by-product sugars described hereinabove, the admixture of the present invention can contain additional amounts of sugars in the form of monosaccharides as for example glucose, fructose and the like and mixtures thereof as well as lower (2-3) polysaccharides such as sucrose with the monosaccharides being preferred. The additional sugar can be in the form of a corn syrup such as commercial high fructose corn syrup which contains up to about a 1:1 ratio of fructose to glucose therein with normally less than about five percent polysaccharides.

It has been presently found that when calcium formate is combined with the other components as described above, one forms a stable, low-cost, water-reducing admixture which is non-corrosive with respect to metal pieces contained in or in contact with the concrete in which it is used. Further, the concrete containing the presently described admixture unexpectedly exhibits the combined desired properties of good set time, high compressive strength, good slump as well as other properties desired by those skilled in the art. The calcium formate can be commercially purchased or can be formed by known methods such as by the neutralization of formic acid with calcium hydroxide or oxide.

With respect to amounts of the components of the subject admixture, the weight ratio of lignosulfonate salt to total sugar content to calcium formate should be about 22–25:2–8:6–16 and preferably 25:2–6:6–12. The admixture can be added in conventional manners during mixing of the wet cement either as a dry powder or as an aqueous solution. The admixture in the form of a powders can be added with the cement or the aggregate but preferably with the latter. The present admixture, being formed of water-soluble components, can be added in the preferred manner as a solution to the cement. For example, the water-reducing admixture solution can be added with the water used in forming the concrete or added after the other constituents of the concrete have been partially mixed. As is common practice, the addition should be made by an adopted fixed procedure for any given project. Care should be taken to provide sufficient mixing of the concrete following addition of the admixture to assure substantially uniform distribution throughout the batch of concrete being formed.

The amount of the above-described active constituents can be present in an admixture solution in any convenient amount. Normally, concentrations of from 15 to 70 percent and preferably 25 to 50 percent by weight of the total solution are suitable to aid in achieving substantially uniform distribution.

The subject admixture should be added to the hydraulic cement in amounts of about 0.05 to 0.3 and preferably from 0.1 to 0.2 lbs. dry weight of the constituents of the admixture per 100 lbs. of dry weight of cement. This is conventionally termed solid admixture per solid cement.

It has been presently found that the subject admixture permits the utilization of lower water to cement ratios while maintaining or improving the slump of the concrete, causing increased compressive strengths, and attaining set times which are generally better than obtained when using conventional admixture. The treated concrete can be readily placed by means of a pump or using a tremie.

It has also been unexpectedly found that the addition of the subject admixtures causes the above-described desired properties when used in combination with hydraulic cements formed of coarse cement material, that is, cements having a surface area of less than about 3500 cm$^2$/gm. It is well known that cements used in certain countries are generally of a substantially coarser gain than the finely pulverized material used in the United States and elsewhere. The conventional water-reducing admixtures as described hereinabove have not been found as effective with respect to these coarse grained cements while the addition of the presently described water-reducing admixture has been unexpectedly found to produce the desired results.

The following examples are given for illustrative purposes only and are not meant to be a limitation on the subject invention except as defined in the claims appended hereto. All parts and percentages are by weight unless otherwise indicated.

EXAMPLE I

An admixture was formed by adding 3 parts of a commercial high fructose corn syrup mixture having 85% solids comprising a mixture of glucose and fructose (~1:1) to 50 parts water and stirring until dissolved. 25.25 parts of a commercially available unpurified magnesium lignosulfonate having about 11 percent tree sugars (mixed monosaccharides) therein was stirred into the mixture until dissolved. 4.7 parts of 88% formic acid and 3.5 parts of calcium hydroxide was added to the mixture to form calcium formate. To the formed admixture was added 3 parts of 37% formaldehyde solution. The pH of the resultant solution was adjusted to 7.5 with formic acid or calcium hydroxide as needed. 10.55 parts water was added. The admixture was analyzed to have a total solids content of 31.1%. The pH of the solution was tested at intervals over a 3 month period and found to be stable.

EXAMPLE II

An admixture was formed by adding 25 parts of commercially available unpurified calcium lignosulfonate containing about 11 percent of a mixture of tree sugars (mixed monosaccharides) to 50 parts of water with stirring until dissolved. 9.3 parts of an 88 percent solution of formic acid and 6.85 parts of calcium hydroxide was added to the mixture to form calcium formate therein. To the formed admixture was added 3 parts of 37% formaldehyde solution and the pH of the resultant admixture was adjusted to about 7.5 by the addition of formic acid or calcium hydroxide as needed. 5.85 parts of water was added. The admixture was analyzed as having a solid content of 34 percent. The pH of the admixture was stable over a three month period.

EXAMPLE III

An admixture was formed in the same manner as described in Example II above except that 3 parts of a commercially obtained high fructose corn syrup having 88 percent solid mixture of glucose and fructose (1:1) was initially added to the water. The total solid content was analyzed as about 37 percent.

EXAMPLE IV

For comparative purposes an admixture was formed in the same manner as in Example III above except that in lieu of the calcium formate 5.5 parts of calcium chloride dihydrate was added. The admixture was diluted with water to have a total solid content of 27 percent.

EXAMPLE V

For comparative purposes, an admixture was produced using the procedure of Example III except that 23 parts calcium lignosulfonate and 11.4 parts corn syrup as described in Example III were used and 5.7 parts triethanolamine was substituted for the formed calcium formate. The total solid content was 36%. The pH over a 3 month period was observed to drop significantly.

EXAMPLE VI

Each of the admixtures formed according to Examples I to V above was added to batches of commercially obtained hydraulic cement (Type II) having analysis indicated in Table I below:

Table I

| Cement | SiO$_2$ | Al$_2$O$_3$ | Fe$_2$O$_3$ | CaO | MgO | SO$_3$ | K$_2$O | Na$_2$O | Surface Area cm$^2$/gm |
|---|---|---|---|---|---|---|---|---|---|
| A(Pittsburgh) | 21.4 | 4.5 | 5.3 | 63.4 | 2.6 | 2.0 | 0.4 | 0.2 | 3775 |
| B(Maringa) | 21.8 | 4.5 | 2.5 | 61.8 | 6.0 | 1.0 | 0.5 | 0.3 | 2750 |
| C(Votoran 320) | 22.4 | 5.3 | 2.3 | 59.8 | 6.6 | 1.6 | 0.9 | 0.1 | — |
| D(Votoran 250) | 22.2 | 4.9 | 2.3 | 61.1 | 6.3 | 1.5 | 1.0 | 0.1 | — |
| E(Ipanema) | 20.2 | 6.3 | 4.3 | 56.6 | 5.2 | 2.1 | 1.4 | 0.3 | 3200 |

The concrete samples were each formed in accordance with the testing procedures of ASTM C-494 with the admixture being added simultaneously with addition of the water to the cement. The penetration resistance of each sample was determined according to ASTM C-403 (modified by using unsieved mortar), *Standard Method of Test for Time of Setting of Concrete in Penetration Resistance*, from initial mix to final set (4000 psi). Time (in hrs.) of initial set (500 psi) (i) and final set (f) are indicated below:

Table II

| Cement | No Admixture | | Example Number of Admixture | | | | | | | | |
| | | | I | | II | | III | | IV | | V | |
| | i | f | i | f | i | f | i | F | i | f | i | f |
|---|---|---|---|---|---|---|---|---|---|---|---|---|
| A | 6.5 | 8.7 | 8.7 | 12 | 8.7 | 10.8 | 8 | 10.7 | — | — | 13 | 17 |
| B | 7.1 | 11 | 11 | 15 | 10 | 14.8 | 11 | 16.5 | 10 | 14.2 | 13 | 22 |
| C | 7 | 10.3 | 9 | 13.2 | 8 | 12.2 | 10.2 | 14 | 9.2 | 14 | 19 | 25.5 |
| D | 5.8 | 9.2 | 9 | 13.8 | 8.2 | 13.2 | 8.5 | 13 | 9.8 | 14.2 | 24 | 32.2 |
| E | 7.9 | 10.8 | 9 | 12 | 8.2 | 11 | 9.2 | 11.8 | 9.5 | 12.5 | — | 12 |

These results clearly show that the water-reducing admixtures of the present invention have substantially equal performances as the calcium chloride admixture (Admixture IV) but without corrosive effects associated therewith and perform in a superior manner to the triethanolamine containing admixture (Admixture V) and without instability problems associated therewith.

EXAMPLE VII

A determination was made in accordance with standard test procedures for slump, air entrainment and compressive strength for concrete samples formed from two Type II hydraulic cements used at a cement factor of 5 sacks per cubic yard. The obtained data is given hereinbelow:

| | Admixture | | | |
| | Blank | Ex. I | Ex. II | Ex. V |
|---|---|---|---|---|
| Cement A | 1 | 1 | 1 | 1 |
| Water | 0.60 | 0.57 | 0.57 | 0.57 |
| Coarse Agg. | 2.95 | 2.95 | 2.95 | 2.95 |
| Fine Agg. | 2.35 | 2.35 | 2.35 | 2.35 |
| Admixture Dose % s/s | — | 0.10 | 0.10 | 0.10 |
| Admixture Dose (%) | — | 0.32 | 0.29 | 0.26 |
| Slump | 3" | 3¼" | 4¼" | 2¼" |
| Compressive Strength, psi 6" × 12" Cylinder | | | | |
| 3 days | 1680 | 1870 | 2155 | — |
| 7 days | 2910 | 2975 | 3140 | 3180 |
| 28 days | 4510 | 4855 | 4640 | 4705 |

| | Blank | Ex. I | Ex. II | Ex. III | Ex. IV |
|---|---|---|---|---|---|
| Cement B | 1 | 1 | 1 | 1 | 1 |
| Water | 0.47 | 0.43 | 0.43 | 0.43 | 0.43 |
| Coarse Agg. | 3.45 | 3.45 | 3.45 | 3.45 | 3.45 |
| Fine Agg. | 1.89 | 1.89 | 1.89 | 1.89 | 1.89 |
| Admixture Dose | — | 0.10 | 0.10 | 0.10 | 0.10 |

| | Admixture | | | | |
| | | | | | |
|---|---|---|---|---|---|
| % s/s Admixture Dose (%) | — | 0.32 | 0.29 | 0.27 | 0.37 |
| Air (%) | 2.2 | 5.4 | 5.2 | 4.6 | 5.9 |
| Slump (inches) | 3¼ | 4¼ | 4 | 3¼ | 4¼ |
| Compressive Strength, psi 6" × 12" Cylinders | | | | | |
| 7 days | 3850 | 4340 | 4073 | 4220 | 4090 |
| 28 days | 5633 | 6037 | 5660 | 5763 | 5263 |

The samples formed at reduced water to cement ratios with admixtures of the present invention exhibited superior workability as shown by their greater slump, air entrainment and 28 day compressive strength than the higher water content sample and also exhibited greater slump than the comparative samples using a triethanolamine containing admixture (V) and superior compressive strength than comparative samples using calcium chloride containing admixture (IV).

While the invention has been described in connection with certain preferred embodiments, it is not intended to limit the invention to the particular forms set forth, but, on the contrary, it is intended to cover such alternatives, modifications and equivalents as defined by the appended claims.

What is claimed is:

1. A water-reducing admixture for use in hydraulic cement compositions consisting essentially of a lignosulfonate selected from an alkali metal lignosulfonate or alkaline earth metal lignosulfonate; sugar selected from monosaccharides and lower polysaccharides and mixtures thereof; and calcium formate: the weight ratio of lignosulfonate to sugar to calcium formate being about 22–25:2–8:6–16.

2. The admixture of claim 1 wherein said admixture is present in an aqueous solution in concentrations of from 10 to 70 percent by weight based on the total weight of the solution.

3. The admixture of claim 1 wherein the lignosulfonate is an unpurified by-product formed during a sulfite wood-pulping process.

4. The admixture of claim 2 wherein the weight ratio of components is 25:2–6:6–12.

5. The admixture of claim 2 where the lignosulfonate is selected from calcium, sodium, or magnesium lignosulfonate and the sugar is selected from tree sugars and corn-syrup sugars and mixtures thereof.

6. The admixture of claim 2 wherein the lignosulfonate is calcium or magnesium lignosulfonate.

7. The admixture according to claim 3 wherein the sugar is tree sugar and corn syrup.

8. The admixture according to claim 7 wherein the corn syrup contains a major portion of glucose and fructose in a weight ratio of about 1:1.

9. A hydraulic cement composition having a water-reducing admixture therein, wherein the admixture is defined by claims 1, 2, 3, or 5.

10. The hydraulic cement of claim 9 wherein the cement has a particle size such that the average surface area is less than about 3500 $cm^2/gm$.